United States Patent [19]

Gorai

[11] 4,079,118

[45] Mar. 14, 1978

[54] METHOD FOR REMOVING NITROGEN OXIDES USING FERRICION-EDTA COMPLEX SOLUTIONS

[75] Inventor: Tokio Gorai, Ichiharashi, Japan

[73] Assignee: Chisso Engineering Co Ltd, Tokyo, Japan

[21] Appl. No.: 537,022

[22] Filed: Dec. 27, 1974

[30] Foreign Application Priority Data

Dec. 27, 1973   Japan .................................... 49-968

[51] Int. Cl.$^2$ ........................................... C01B 21/00
[52] U.S. Cl. ..................................... 423/235; 252/182
[58] Field of Search ............... 423/235, 351, 367, 243, 423/239, 242; 252/182

[56] References Cited

U.S. PATENT DOCUMENTS

| | | | |
|---|---|---|---|
| 1,420,477 | 6/1922 | Fairlie | 423/242 |
| 2,031,802 | 2/1936 | Tyrer | 423/243 |
| 2,134,482 | 10/1938 | Johnstone | 423/243 |
| 2,142,987 | 1/1939 | Bacon et al. | 423/242 |
| 2,865,707 | 12/1958 | Hogsed | 423/367 |
| 3,044,844 | 7/1962 | Maury et al. | 423/235 |
| 3,415,633 | 12/1968 | Anthony | 423/235 |
| 3,565,813 | 2/1971 | Bersworth | 423/351 |
| 3,757,488 | 9/1973 | Austin et al. | 423/243 |
| 3,784,478 | 1/1974 | Altwicker et al. | 423/235 |
| 3,984,522 | 10/1976 | Saito et al. | 423/235 |
| 3,991,161 | 11/1976 | Saitoh et al. | 423/235 |
| 3,992,508 | 11/1976 | Saitoh et al. | 423/235 |

FOREIGN PATENT DOCUMENTS

| | | | |
|---|---|---|---|
| 1,251,900 | 10/1967 | Germany | 423/236 |
| 1,454,723 | 11/1965 | France | 423/235 |

*Primary Examiner*—O. R. Vertiz
*Assistant Examiner*—Eugene T. Wheelock
*Attorney, Agent, or Firm*—Fred Philpitt

[57] ABSTRACT

Industrial exhaust gas containing nitrogen oxides is treated with an aqueous solution of an iron chelate complex salt which contains essentially a sulfite salt at the time of treatment whereby nitrogen oxides which have been difficult to catch can be absorbed with a high absorbing rate even when the concentration of nitrogen oxides is low in the exhaust gas or sulfur dioxide is included in the gas, and simultaneous desulfurizing can be attained in this case. Said aqueous solution has a large absorbing capacity and may contain an ion or ions of alkali metal, alkali earth metal or ammonium.

4 Claims, No Drawings

METHOD FOR REMOVING NITROGEN OXIDES USING FERRICION-EDTA COMPLEX SOLUTIONS

DESCRIPTION OF THE INVENTION

This invention relates to a method for removing nitrogen oxides from industrial exhaust gas by way of a wet process. The term industrial exhaust gas herein used means exhaust gas in chemical processes or combustion exhaust gas containing as principal components, air, nitrogen, oxygen or carbon dioxide gas and further containing nitrogen oxides such as $NO_2$, $N_2O_3$, NO, etc. and discharged into atmospheric air from industrial plants. The term wet process means those in which treatment is carried out with an aqueous solution or an aqueous treating agent.

On account of notably increased air-pollution caused by nitrogen oxides included in industrial exhaust gas and terrible influence to human bodies in recent years, it has become a pressing need to develope a method for removing nitrogen oxides included, for example, not only in industrial exhaust gas containing a higher concentration of nitrogen oxides which are discharged from nitric acid-manufacturing or nitric acid-using plants but also in industrial exhaust gas containing a lower concentration of nitrogen oxides, produced in the combustion of general fuels.

Among nitrogen oxides included in industrial exhaust gases, nitrogen dioxide ($NO_2$) and nitrogen sesquioxide ($N_2O_3$) have relatively large solubilities in water and high reactivities to alkali. Accordingly they can be removed relatively easily by treating with an aqueous solution or an alkaline solution. However, the greater part of the nitrogen oxides included in industrial exhaust gas is nitrogen monoxide (NO). It is well known that nitrogen monoxide has an extremely small solubility in water and a very low reactivity to alkali and hence they can hardly be removed even with water or an alkaline solution.

In the past, there has been proposed a method in which sodium sulfite solution is used for removing nitrogen oxides in wet process (e.g. Japanese patent publication No. 15484/1965, Patent of Federal Republic of Germany No. 1280219). It has been known since olden times that sulfite salt solution has a capability of absorbing nitrogen monoxide gas chemically, but because of its extremely small absorption rate, percentage absorption of nitrogen monoxide under practical conditions is very small. Accordingly, the conventional process which uses sulfite salt can remove nitrogen sesquioxide and nitrogen dioxide, but for example, in case of the exhaust gas of combustion where almost all the nitrogen oxides are nitrogen monoxide, commercially efficient removal of the nitrogen monoxide has not been attained.

In case of so-called wet process desulfurization, where a solution of an alkali metal salt, alkaline earth metal salt or ammonium salt is used in the treatment for removing sulfur dioxide in industrial exhaust gas, removed sulfur dioxide becomes sulfurous acid or its salts (including bisulfites). Thus it can be expected to remove nitrogen oxides in the above-mentioned exhaust gas with the thus formed sulfurous acid salt. However according to conventional methods, the amount of nitrogen monoxide which can be removed simultaneously with the desulfurization has been so small as to be negligible because of extremely small absorption rate of nitrogen monoxide.

Recently a process has been proposed in which a mixture of a solution of sulfurous acid salt and a ferrous salt solution is used for removing nitrogen monoxide in exhaust gas (Japanese laid-open patent publication No. 59076/1973). It has been known for a long time that a solution of ferrous salt has an absorbing capability of nitrogen monoxide but if the concentration of nitrogen monoxide in an exhaust gas to be treated becomes lower, the ferrous salt solution has a drawback in that its capability for absorbing nitrogen monoxide is extremely reduced and moreover the ferrous salt in the solution is oxidized into the corresponding ferric salt resulting in the loss of absorbing capacity. This drawback is not substantially overcome even with a mixed solution of sulfurous acid and ferrous salt.

It is an object of the present invention to provide a process which has not drawbacks of the abovementioned conventional process. In other words, the object of the present invention is to provide a process in which even the nitrogen monoxide among various nitrogen oxides which has been deemed to be difficult to be absorbed from industrial exhaust gas can be removed with a high absorption rate without undergoing the influence of accompanying gas such as oxygen or the like.

It is another object of the present invention to provide a process which is effective in the prevention of pollution by industrial exhaust gas containing nitrogen oxides.

It is a further object of the present invention to provide a novel composition of treating solution useful for removing nitrogen oxides in industrial exhaust gas.

We have been making a comprehensive study about the compositions of treating solution for nitrogen monoxide which has been presenting an unsolved pending problem in the art of prevention of air-pollution caused by industrial exhaust gas because of its difficulty of absorption, with the intention of obtaining a large absorption capacity and increased absorption rate.

As a result of the study, the above-mentioned object of the present invention can be attained by using a solution in which an iron chelate complex salt is coexistent with a solution of sulfurous acid salt or a solution of alkali metal ion, alkaline earth metal ion or ammonium ion which produces sulfurous acid by reacting with sulfur dioxide.

According to the method of the present invention, industrial exhaust gas containing nitrogen oxides is treated with an aqueous solution of iron chelate complex salt which substantially contains, at the time of treatment, a sulfite salt to eliminate nitrogen oxides.

According to one embodiment of the present invention, industrial exhaust gas containing nitrogen oxides and sulfur dioxide is treated with a solution containing an iron chelate complex salt and at least one ion selected from the group consisting of alkali metal-, alkaline earth metal- and ammonium-ion to eliminate nitrogen oxides.

According to another embodiment of the present invention, a composition of treating solution for industrial exhaust gas which contains an iron chelate complex salt and at least one member selected from the group consisting of alkali metal-, alkaline earth metal-, and ammonium ions.

In a further embodiment, the method of the present invention is applied to the exhaust gas of burning of petroleum, heavy oil, coal, pulverized coal or city gas.

In a still further embodiment, the method of the present invention is applied to the exhaust gas from an absorption tower of nitric acid in an ammonia oxidation plant, an absorption chamber or tower of sulfuric acid of nitric acid process of sulfuric acid manufacture, a reaction apparatus for nitration or nitric acid oxidation.

Solutions of sulfurous acid salts used in the process of the present invention include those of alkali metal sulfites such as sodium- and potassium sulfites, alkaline earth metal sulfites such as magnesium- and calcium-sulfites and ammonium sulfite, alone or in admixture thereof. It does not matter even if an excessive amount of sulfurous acid is contained in the solution and a part or the whole of the sulfite is converted into bisulfite.

Solutions of metal ions which form sulfites by the reaction with sulfur dioxide brought in by the exhaust gas to be treated in the process of the present invention include hydroxides of alkali metals such as sodium, and potassium, alkaline earth metals such as magnesium and calcium and ammonium and mixtures thereof.

Iron chelate complex salt which is to be coexistent with the above-mentioned solutions of sulfite salts includes ferrous or ferric chelate complex salts of acetylacetone, nitrotriacetic acid, ethylene diamine tetraacetic acid, cyclohexanediamine tetraacetic acid, diethylenetriamine pentaacetic acid, citric acid, oxalic acid, malonic acid, phthalic acid, salicylic acid, tripolyphosphoric acid, triethanolamine, or the like. Of course, ferrous or ferric chelate complex salts of compounds other than those enumerated above can be also used.

As for the adding manner, these chelate complex salts themselves can be added. Alternatively, a compound affording ferrous or ferric ion in a solution and a chelate complex salt forming agent such as acetylacetone, etc. can be separately added to a solution to form a chelate complex salt in the solution.

As for the solvent for the solution to be used in the present invention (which will be hereinafter referred to simply as treating solution of the present invention), water is usually employed, but, so long as the object of the present invention is not hindered, for example, water containing salts such as sea water, water containing a small amount of organic compound as in water recovered in factories, etc. can be also used.

As for the concentration of the above-mentioned iron chelate salt to be included in the treating solution of the present invention, there is no particular limitation so long as it is dissolved in the solution. However, as shown in Examples which follow hereinafter, a range of 0.1% - 10%, particularly 0.2% - 4%, is preferable. If the concentration is too low, for example, less than 0.1%, the nitrogen monoxide-absorbing capacity and the velocity of the treatment of the treating solution of the present invention decrease, while even if a high concentration such as that exceeding 10% is used, it does not particularly improve effectiveness and is not economical.

As for the concentration of the above-mentioned sulfite salt to be included in the treating solution of the present invention, there is no particular limitation so long as this is dissolved in the solution. However, as shown in Examples which follow hereinafter, a range of 2% - 30% (or saturated concentration according to the kind of the salt used), preferably 5% - 25% is used. If the concentration is too low, for example, lower than 2%, the nitrogen monoxide, (nitrogen dioxide), (nitrogen sesquioxide)-absorbing capacity and velocity of the treating solution of the present invention decrease, while even if a high concentration such as that exceeding 30% is used, it does not particularly increase effectiveness, but in some case, rather brings about such a trouble that the sulfite salt deposits and adheres onto a part of the treating apparatus for industrial exhaust gases.

According to the present invention, industrial exhaust gases are treated by means of a solution containing iron chelate salt as mentioned above, but, as for the treating conditions such as treating apparatus, temperature, pressure, etc., those usually employed in wet processes for the removal of sulfur oxides (mainly $SO_2$ and $SO_3$) and other detrimental ingredients contained in industrial exhaust gases are satisfactorily used, and no particular consideration is necessary. For example, as for the treating apparatus to be employed in the present invention, a treating solution vessel provided with a stirrer is employed, and in its use, the treating solution of the present invention is introduced therein, and an industrial exhaust gas is blown into it with stirring by means of a blower or the like, or industrial exhaust gases are contacted with the treating solution of the present invention in parallel flow or counter flow using a gas-liquid contact apparatus of packed column (or wet wall column or various kinds of plate column) type. As for the temperature of the treating solution of the present invention, any of those in the range of room temperature to 70° C are employed in many cases, but a lower temperature such as about 0° C or a higher temperature such as about 100° C can be also employed so long as no obstacle is brought about thereby. As for the temperature of industrial exhaust gases to be treated according to the process of the present invention, the gases, particularly combustion exhaust gases at e.g. 100° - 300° C can be used as they are, but they may be used after cooled in advance below 100° C by means of air or others maintained at room temperature.

Further, as for the pressure of the exhaust gases, they are treated usually under the atmospheric pressure, but if necessary, they can be treated under a pressure of 5 $Kg/cm^2$ or lower or under a reduced pressure in the vicinity of 100 mm Hg.

As for the treating manner in the present invention, industrial exhaust gases are usually continuously treated according to the condition of the gases generated, and as for the retention time of the gases to be treated, those in the range of one second to several minutes are employed in many cases, but if necessary, it is possible to treat the gases batchwise, for a retention time in the range of several minutes to several hours. Particularly in case where the percentage removal of nitrogen monoxide is to be elevated to 95 - 99% or higher, it is preferable to treat the gases to be treated for a relatively long time.

According to the process of the present invention, when sulfur oxides (mainly $SO_2$ and $SO_3$) are contained in the objective exhaust gases, it is possible to remove the oxides at the same time, and further since oxygen is included in the objective exhaust gases, the process can be effectively carried out even when ferrous chelate salt is oxydized into ferric chelate salt.

Further according to the process of the present invention, it is possible to remove nitrogen oxides at a high percentage absorption from various industrial exhaust gases containing nitrogen oxides, particularly combusion exhaust gases, wherein the content of the nitrogen oxides is small and the most part thereof is nitrogen monoxide and whose treatment has been difficult according to any of conventional processes, and further, when $SO_2$ is contained in the exhaust gases, it is possible to simultaneously remove $SO_2$ together with nitrogen oxides.

The present invention will be further illustrated in detail by the following Examples and Comparative Examples.

EXAMPLES 1 - 11

Two hundreds ml of each of various absorbing solutions shown in Table 1 was introduced into a 500 ml capacity cylindrical absorption vessel, and nitrogen gas (at room temperature and under the atmospheric pressure) containing about 1,000 ppm of nitrogen monoxide gas was passed through the solution at a rate of 660 ml/min under vigorous stirring at room temperature. The respective relationships between the composition of the absorbing solution measured according to naphthylethylenediamine process of JIS (JIS: Japanese Industrial Standards) and the percentage removal of nitrogen monoxide 30 minutes after the starting of the pass of the nitrogen gas, are shown in Table 1.

Table 1

| Ex. No. | Kind and concentration of sulfite salt in solution (aqueous) | Kind and concentration of iron chelate complex salt in solution (aqueous) | | Percentage removal of NO (%) |
|---|---|---|---|---|
| 1 | Sodium sulfite 20% | $Fe^{II}$-EDTA | 2% | 95 |
| 2 | Ammonium sulfite 20% | $Fe^{II}$-acetylacetone | 2% | 49 |
| 3 | " | $Fe^{II}$-EDTA | 2% | 97 |
| 4 | " | $Fe^{II}$-malonic acid | 2% | 45 |
| 5 | " | $Fe^{II}$-tripolyphosphoric acid | 2% | 67 |
| 6 | " | $Fe^{III}$-triethanolamine | 2% | 50 |
| 7 | " | $Fe^{III}$-EDTA | 2% | 78 |
| 8 | " | $Fe^{II}$-EDTA | 0.4% | 84 |
| 9 | Ammonium sulfite 10% Ammonium bisulfite 10% | $Fe^{II}$-EDTA | 2% | 96 |
| 10 | Ammonium bisulfite 20% | " | | 97 |
| 11 | Calcium sulfite (saturated) | " | | 99 |

Notes:
$Fe^{II}$ and $Fe^{III}$ mean ferrous atom and ferric atom, respectively. EDTA means ethylenediaminetetraacetatic acid. Concentration % is by weight.

COMPARATIVE EXAMPLES 1 - 5

Example 1 was repeated except that solutions shown in Table 2, which do not satisfy at least one of the requirements of the present invention, were employed. The resulting percentages removal of nitrogen monoxide are shown in Table 2.

Table 2

| Comparative Example No. | Sulfite salt in solution | Additive in solution | | Percentage removal of NO (%) |
|---|---|---|---|---|
| 1 | nil | $Fe^{II}$-EDTA | 2% | 40 |
| 2 | nil | $Fe^{II}$-$SO_4$ | 1% | 5 |
| 3 | Ammonium sulfite 20% | " | | 25 |
| 4 | " | EDTA | 1% | 10 |
| 5 | " | nil | | 10 |

When the results of the above Comparative Examples are compared with that of Example 1, it is clear that the effectiveness of the present invention is remarkable.

EXAMPLE 12

An aqueous solution maintained at 60° C and obtained by adding 2% by weight of $Fe^{II}$-ethylenediamine-tetraacetic acid to an aqueous solution containing 15% by weight of ammonium sulfite and 5% by weight of ammonium bisulfite was caused to flow down at a rate of 0.5 l/min, from the top of a Raschig ring packed column having a diameter of 100 mm and a packing height of 3 m, while a combustion exhaust gas (120° C, atmospheric pressure) discharged from a heavy oil combustion boiler was introduced into the column at the bottom thereof at a rate of 70 l/min, with a relationship of counter flow contact of gas and liquid.

Compositions (in dried state) of unreacted exhaust gas and treated exhaust gas discharged from the upper part of the column are shown in Table 3.

Table 3

| Kind of gas | Content in untreated exhaust gas | Content in treated exhaust gas |
|---|---|---|
| NO | 550 Vol-ppm | 80 Vol-ppm |
| $NO_2$ | 50 Vol-ppm | 5 Vol-ppm |
| $SO_2$ | 1200 Vol-ppm | 100 Vol-ppm |
| $CO_2$ | 13.5 Vol-% | 13.5 Vol-% |
| Oxygen | 3.5 Vol-% | 3.3 Vol-% |
| Nitrogen | 82.8 Vol-% | 83.2 Vol-% |

EXAMPLE 13

Exhaust gas in the same amount and of the same composition (same temperature, same pressure) as in Example 12 was passed through the same apparatus as in Example 12, while supplying from the top of the column, at a rate of 0.12 L/hr, 5% (by weight) aqueous solution of ammonia containing 1% (by weight) of ethylenediamine-tetraacetic acid (at room temperature), and at a rate of 6 ml/hr, 20% (by weight) aqueous solution of ferrous sulfate (at room temperature), and recirculating the liquid caused to flow down to the bottom to the top of the column at a rate of 0.5 L/min. In this case, the amount of the solution retained in this system was maintained at 10 L and the excessive amount of the solution was withdrawn from the bottom and subjected to recovery treatment for sulfate. The contents of nitrogen oxides and $SO_2$ in the discharged gas from the top of the column in this case were as follows:

| NO | 85 | Vol-ppm |
|---|---|---|
| $NO_2$ | 5 | " |
| $SO_2$ | 100 | " |

What is claimed is:

1. A method for removing nitrogen monoxide from gases containing the same which consists essentially of contacting said gases with an aqueous solution consisting essentially of a ferric ion - ethylenediaminetetraacetic acid complex salt and a sulfite salt selected from the group consisting of ammonium sulfite, alkali metal sulfites and alkaline earth metal sulfites, and recovering a gas containing a reduced content of nitrogen monoxide, the concentration of said complex salt in the aqueous solution being 0.1 - 10% and the concentration of the sulfite salt in the aqueous solution is 2 - 30%.

2. A method according to claim 1 wherein said sulfite salt is selected from the group consisting of ammonium sulfite sodium sulfite and calcium sulfite.

3. A method according to claim 1 wherein the concentration of said complex salt in the aqueous solution is 0.2 - 4%.

4. A method according to claim 1 wherein the concentration of the sulfite salt in the aqueous solution is 5 - 25%.

* * * * *